Patented Aug. 20, 1946

2,406,294

UNITED STATES PATENT OFFICE 2,406,294

INSECTICIDE

James W. Hansen and Carroll C. Cassil, Berkeley, Calif., assignors to California Spray-Chemical Corporation, Richmond, Calif., a corporation of Delaware No Drawing. Application June 27, 1945, Serial No. 601,916

12 Claims. (167—33)

This invention relates to compositions which are highly effective in the control of may insect pests, and which contain as an active toxic ingredient a synthetic organic compound which we have discovered, namely, cyclopropyl furyl propenone.

As is well known, substances which possess the property of paralyzing and killing noxious insects when brought into contact with the insect by various means such as spraying, dusting, etc., have very great economic importance, not only for the protection of crops, but also for their contribution to the sanitation and comfort of man and animals. Pyrethrum is an example of a toxic agent of this kind. The efficiency of such insecticides is measured by two principal factors, namely, the degree of "knock-down," and the per cent "kill." Various known insecticides possess these properties in varying degree. For example, pyrethrum has the property of producing a high degree of knock-down, but many of the insects so immobilized ultimately recover. We have found that cyclopropyl furyl propenone, even when used in low concentration, combines to an outstanding degree the properties of high knock-down and high mortality. At the same time this substance can be synthesized without difficulty, and it is free from objectionable odor. Furthermore, when used in amounts adequate to afford satisfactory pest control, it has no undesirable effect on fabrics or furniture, and produces no irritation or symptoms of toxicity in contact with warm blooded animals.

The compound of our invention possesses, in addition to the power to paralyze and kill many insects on direct contact, the power to kill by means of the toxicity of its vapor. This surprising combination of properties adds to the effectiveness of the insecticidal compositions described herein containing cyclopropyl furyl propenone. It is well known that the contact insecticides in common use are effective only insofar as the solid or liquid phase of the material can be applied to the body of the insect. It is extremely difficult and usually impossible to reach all of the insects in an infested area with a spray or dust. Some of the insects will be in protected locations such as crevices, leaf curls, etc., and will escape. This fact necessitates both heavy and repeated applications of insecticide, with corresponding wastage.

These disadvantages are in substantial degree overcome by the use of cyclopropyl furyl propenone. Due to its relatively high vapor pressure and the toxicity of its vapors its lethal effectiveness is not limited to direct contact, but tends to permeate adjacent cracks, webs, and other sheltered places, so that when dispersed in the form of a spray or a dust it acts both as a contact poison and as a fumigant.

Moreover, the toxicity of the vapor of cyclopropyl furyl propenone is such that it may be used simply as a fumigant against many insect pests including the clothes moth. Evaporation at room temperature is sufficiently rapid so that no heating is needed for most fumigations.

The compound which we have discovered to possess these valuable properties which make it outstanding for use as a toxic ingredient of insecticides is chemically described as "1-cyclopropyl, 3(2-furyl), 2-propen-1-one." It is for convenience referred to herein as "cyclopropyl furyl propenone." Its structural formula is as follows:

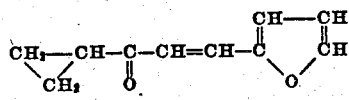

One method of preparing this compound is as follows: Cyclopropyl methyl ketone and furfural in approximately equimolar ratio are agitated in the presence of an aqueous alkaline solution for several hours at normal atmospheric temperature. Following this period of agitation the reaction mix is allowed to settle. Cyclopropyl furyl propenone settles readily to the bottom of the vessel either in the form of yellow crystals or, in some cases, possibly due to the absence of seed crystals, in the form of an oily liquid. The product is segregated, by decantation, for example, and is washed with water or with dilute mineral acid. It may be further purified by simple steam distillation or, if greater purity is required, by vacuum distillation or by recrystallization from a solvent such as petroleum ether.

The pure substance, cyclopropyl furyl propenone, is, at normal atmospheric temperature, a colorless crystalline solid. The crystals are regular, rhombic, tabular in form, and exhibit parallel extinction. Crystallization does not take place readily except in the presence of at least a minute seed crystal of the substance, and, therefore, if reasonable precautions are taken, it may be preserved as a liquid even at temperatures many degrees below its melting point. In liquid form, cyclopropyl furyl propenone is a light straw color and has a distinctive, agreeable odor. This substance has the following properties:

| | |
|---|---|
| Boiling point, (plus or minus 0.5° C.): | |
| At 6 mm. Hg | 123.5° |
| At 12 mm. Hg | 137.0° |
| At 30 mm. Hg | 162.0° |
| Melting point | 38–38 ½° C. |
| Index of refraction of liquid | 1.6076 $\frac{20°}{20°}$ |
| Density of liquid at 25° C | 1.102 |
| Solubility in water | Less than 0.01% |
| Molecular weight | 162 |

This substance is soluble in such organic solvents as acetone, ether, petroleum ether and furfural. It is sufficiently soluble in petroleum oil fractions such as kerosene and spray oils to permit its effective use as an insecticide in such carriers.

Cyclopropyl furyl propenone is somewhat unstable in the pure state even when kept in the dark and gradually changes from colorless to slightly yellow. The technical material as obtained without recrystallization will, on standing, change in color from light amber to dark yellow or dark red. This change reaches equilibrium after a short time, and affects only one to five per cent of the material. When dissolved in petroleum oil, the stability of cyclopropyl furyl propenone is improved even in the presence of strong sunlight. This slight instability is without apparent effect on the insecticidal value of the compound. Consequently, it is usually not necessary to resort to recrystallization or vacuum distillation when preparing the product for insecticidal compounding.

Cyclopropyl furyl propenone possesses insecticidal properties to a high degree. Since it is extremely toxic to houseflies and mosquitoes it is very valuable for use in a "household" spray, i. e., as an ingredient in compositions adapted to be used as a space spray. For this purpose it is desirable to incorporate it with a light well-refined petroleum distillate of the kerosene type suitable for dispersion by means of a spray gun. An example of a suitable sprayable material for such use is 2% to 5% by weight of cyclopropyl furyl propenone dissolved in 98% to 95% by weight of light petroleum oil. A typical petroleum oil suitable for use in such spray solution is a refined kerosene type fraction having the following qualities:

| | |
|---|---|
| Specific gravity | 0.8018 |
| Saybolt Universal viscosity ° F | 32 to 100 |
| Unsulfonated residue | 95 |
| ASTM distillation: | |
| Initial ° F | 340 |
| End point ° F | 520 |

This composition produces highly efficient results, i. e., rapid knock-down and high mortality, when atomized into a room without further dilution. At the same time it does not damage walls, fabrics or furniture and causes no irritation or injury to human beings or to pets. A quantity of undiluted cyclopropyl furyl propenone applied to the skin and allowed to remain for fifteen minutes caused no discomfort and produced no redness or other evidence of irritation or stain.

The effectiveness of cyclopropyl furyl propenone when used as a spray in oil against houseflies is shown by the following test results, which likewise show for comparison results obtained by the use of a spray containing pyrethrum. The composition used for these tests consisted of small percentages of the toxic ingredient in solution in light petroleum (kerosene) oil of about 0.8018 specific gravity and unsulfonated residue of 95. The same oil, the same test apparatus and procedure and the same strain of houseflies (identically reared under laboratory conditions) were used in all tests. All tests were replicated several times. The results were obtained by the Hoskins technique in a standard "Hoskins chamber" (described in "Chemical Control of Insects," edited by Campbell and Molten, 1943, at page 130), using 4 ml. of spray solution in each test.

| Compound | Conc. of comp., percent by weight | Knock-down | | Mortality percent in 24 hrs. |
|---|---|---|---|---|
| | | Percent | Min. | |
| Cyclopropyl furyl propenone | 1.0 | 25 | 10 | 56 |
| Pyrethrum extract [1] | 1.37 | 100 | 10 | 48 |
| Do [1] | 1.83 | 100 | 4 | 60 |
| Cyclopropyl furyl propenone | 2.5 | 97 | 10 | 91 |
| Do [1] | 5.0 | 100 | 4— | 100 |

[1] Commercial "20 to 1" extract containing 2.4% pyrethrins.

The efficacy of sprays of light oil containing cyclopropyl furyl propenone against other insects is further shown by the following results of carefully controlled tests:

| Percent cyclopropyl furyl propenone in light spray oil | Oil deposit per sq. in. | Insect | Percent mortality |
|---|---|---|---|
| | Mg. | | |
| 7.5 | 1.2 | German cockroach | 100 |
| Blank (oil only) | 1.2 | do | 0 |
| 7.5 | 1.2 | European earwig | 100 |
| 3.75 | 1.2 | do | 25 |
| Blank (oil only) | 1.2 | do | 0 |
| 3.75 | 0.8 | Potato tuber moth larvae | 65 |
| Blank (oil only) | 0.8 | do | 10 |

Cyclopropyl furyl propenone has a distinctive but pleasant odor, and therefore its use in household sprays does not require the addition of a perfume or masking odor, as is the case with ordinary fly sprays. The odor of cyclopropyl furyl propenone is sufficiently distinctive and sufficiently pleasant so that it masks the odor of the kerosene.

Cyclopropyl furyl propenone may be advantageously used as an aerosol, due to its property of effective knock-down, as well as its solubility in available oils, alcohols and ethers. This use is brought about by dissolving it in a solvent which is substantially immediately volatile at average atmospheric conditions, the solution being kept in a tight container under sufficient pressure to maintain the solvent in liquid form until desired for use.

Although cyclopropyl furyl propenone may be effectively used in combatting insect pests by bringing it into contact with the insects by some dispersing means such as mechanical spray or aerosol, we have discovered, as previously stated, that it possesses to an important degree the property of a fumigant, that is, its vapor is highly toxic to many insects. This fumigant property is accurately shown by the following results of tests carried out under carefully controlled laboratory conditions. A quantity of crystalline cyclopropyl furyl propenone (500 mg.) was placed in a loosely woven cloth container which was inserted in the lid of a wide-mouth one-gallon glass jar and test insects were placed at the bottom of the jar. Evaporation under normal atmospheric conditions was allowed to continue for two hours, following which the lid was removed, the jar aired out and covered with a clean cloth. The following results were observed:

|  | Per cent kill (24 hours) |
|---|---|
| Rose aphid | 70 |
| Bean weevil | 80 |
| Clothes moth | 100 |
| Mediterranean flour moth | 100 |
| Confused flour beetle | 10 |

Due to its effectiveness as a fumigant against various insect pests, and its pleasant odor, cyclopropyl furyl propenone is well adapted for the periodic control of such insects as moths and fleas in living and storage apartments, for easy and effective use in greenhouses, and for the fumigation of seed and grain.

Another field of use for the compound described is in horticulture. For such purpose it is desirable to prepare a base composition which may be transported to the field in concentrated form and there diluted with a dispersing or carrying agent, such as water. An example of a suitable base composition or concentrate of this type is as follows:

| Ingredient | Percent by weight |
|---|---|
| Cyclopropyl furyl propenone | 20–30 |
| Vegetable oil | 8–16 |
| Emulsifier | 33 |
| Petroleum spray oil | To make 100 |

The vegetable oil which we prefer to use in the above composition is cottonseed oil, corn oil, or pine oil. A satisfactory emulsifier for use in this composition is a higher fatty acid ester of a commercial polyethylene glycol of high molecular weight, such as the available glycols ranging in molecular weight from about 300 to 600. A preferred ester is one made by esterifying nonvolatile fatty acids with polyethylene glycol having a molecular weight of the order of 400. The fatty acids suitable for use in this esterification may be a mixture of higher acids such as is found in the commercial products "tall" oil, marine fatty acids, coconut fatty acids, and "red" oil, or it may be a relatively refined product. A suitable petroleum spray oil is the petroleum fraction heretofore described, having a specific gravity of about 0.8018, or a similar oil blended with a lesser proportion of heavier "neutral" oil. Any oil so used should preferably have a high unsulfonated residue, e. g., 90 or more. This solution is adapted to be used in a 1–400 or 1–300 dilution with water with which it readily emulsifies. This diluted composition may be freely applied to leafy crops and to fruits without danger of phytocidal effect and provides efficient protection against a large number of insect pests.

A simpler but highly effective composition, especially for use in making veterinary "dip" solutions, is one in which the principal ingredients are cyclopropyl furyl propenone, about 40% by weight, and polyethylene glycol esters of higher fatty acid, about 60% by weight. Such composition is adapted for use in 1–400 to 1–800 dilution in water as an animal wash.

It is frequently desirable to apply insecticides in the form of dust. This is true not only in the case of application to field crops and orchards but also for application to animals. An example of a preparation adapted to be used without further dilution for the dusting of vegetation is as follows:

| Ingredient | Percent by weight |
|---|---|
| Cyclopropyl furyl propenone | 2 to 5 |
| Wetting agent | 1.0 |
| Inert powdered extender | to make 100 |

A similar insecticidal dust for application to animals or to living quarters may be made by the use of from 3% to 10% of cyclopropyl furyl propenone in the above formula. An example of wetting agent suitable for use in this formula is sodium lauryl sulfate. Examples of suitable extenders are any one or combination of the following in powdered form: soapstone, talc, pyrophyllite and sulfur. The ingredients of these dust compositions may be ground up together in the desired proportions. One desirable way of preparing such dusts is to dissolve the cyclopropyl furyl propenone in a volatile solvent such as a low boiling petroleum fraction or alcohol, then to spray this solution over the powdered extender and, after the solvent has been removed by evaporation, to regrind the material.

It has been the practice of contact insecticide compounders to make use of various powdered extenders in addition to those named above. Many of the materials previously used for this purpose have adsorbent properties, for example, fuller's earth, diatomaceous earth, walnut shell flour, etc. While cyclopropyl furyl propenone may be used with such adsorbent materials, we have found that distinctly better results are obtained when it is used in conjunction with non-adsorbent, relatively nonporous materials such as those previously mentioned. That is, other things being equal, greater insecticide efficiency is obtained when cyclopropyl furyl propenone is compounded with nonporous dusting powder such as talc, than when it is compounded with adsorbent material such as diatomaceous earth. A preferred form of our invention, therefore, is the use of dusting compositions containing, as the principal toxic ingredient, cyclopropyl furyl propenone together with relatively nonporous, nonadsorbent, finely divided solids.

The above are examples of the kind of compositions which we have found to be convenient and suitable for obtaining practical effective pest control by the use of cyclopropyl furyl propenone. We have found, however, that the compound is compatible chemically, both under storage conditions and in field use, with many known insecticides and fungicides, including lead arsenate, calcium arsenate, thiocyanates, phenothiazine, pyrethrum, rotenone, wettable sulfur and copper compounds, lime-sulfur, and Bordeaux mixture. Since cyclopropyl furyl propenone, while toxic to a large number of insects, is not toxic, or not markedly toxic, to all insects, it is in some instances advantageous to incorporate a small amount of one or more of these additional insecticides in the compositions containing cyclopropyl furyl propenone.

Dust compositions containing 15% of cyclopropyl furyl propenone have produced no harmful effects on rose foliage. Although used in concentrations several times those ordinarily needed for adequate pest control, no leaf burning or other injury was observed on this type of plant. Likewise, no apparent harm or appreciable staining was caused by the application of compositions containing cyclopropyl furyl propenone in insecticidal amounts to fabrics, or furniture finish. The same freedom from injury ascribable to the presence of cyclopropyl furyl propenone is true in the case of oil sprays and water sprays containing insecticidal amounts of cyclopropyl furyl propenone.

We have previously mentioned the compatibility of cyclopropyl furyl propenone with various special-purpose toxicants and carriers. By the term "carrier" we intend to include such materials as assist in the dispersion of the cyclopropyl furyl propenone as well as those which impart spreading, wetting, conditioning, adhering, solvent, or emulsifying action. Examples of carriers include, in addition to those specifically mentioned above, chlorinated solvents, alkylated naphthalenes, esters, vegetable oils, and soaps.

We claim:

1. An insecticidal composition containing as active toxic ingredient cyclopropyl furyl propenone and a carrier therefor.

2. An insecticidal composition containing as active toxic ingredient from 1% to 40% by weight of cyclopropyl furyl propenone and a carrier therefor.

3. An insecticidal composition containing as active toxic ingredient cyclopropyl furyl propenone in oil solution and a carrier therefor.

4. An insectitcidal spray composition containing as active toxic ingredient from 1% to 5% by weight of cyclopropyl furyl propenone dissolved in plant spray petroleum oil.

5. An insecticidal spray concentrate comprisisng from 20% to 30% by weight of cyclopropyl furyl propenone in oil solution, and a water emulsifying agent.

6. An insecticidal spray concentrate comprising from 20% to 30% by weight of cyclopropyl furyl propenone, from 5% to 20% by weight of vegetable oil, and the balance consisting of petroleum spray oil and a water emulsifying agent.

7. An insecticidal solution in which the principal active ingredients are cyclopropyl furyl propenone and polyethylene glycol esters of higher fatty acid in weight ratio of about 40:60.

8. An insecticidal composition containing as active toxic ingredient cyclopropyl furyl propenone in finely divided form, mixed with a powdered solid carrier.

9. An insecticidal composition containing from 2 to 5% by weight of cyclopropyl furyl propenone, about 1% by weight of a wetting agent, and an inert powdered solid carrier.

10. An insecticidal composition comprising as active toxic ingredient cyclopropyl furyl propenone extended by means of a volatile solvent over a powdered solid carrier.

11. An insecticidal composition comprising as active toxic ingredient cyclopropyl furyl propenone extended by means of a volatile solvent over a nonadsorbent solid carrier.

12. The method of controlling insect pests which comprises dispersing over the insect infested area a composition the active toxic ingredient of which is cyclopropyl furyl propenone together with a carrier therefor.

JAMES W. HANSEN.
CARROLL C. CASSIL.